F. L. SMITH & T. B. WILLIAMS.
ROTARY SCRAPER.
APPLICATION FILED DEC. 9, 1908.
1,012,926.
Patented Dec. 26, 1911.
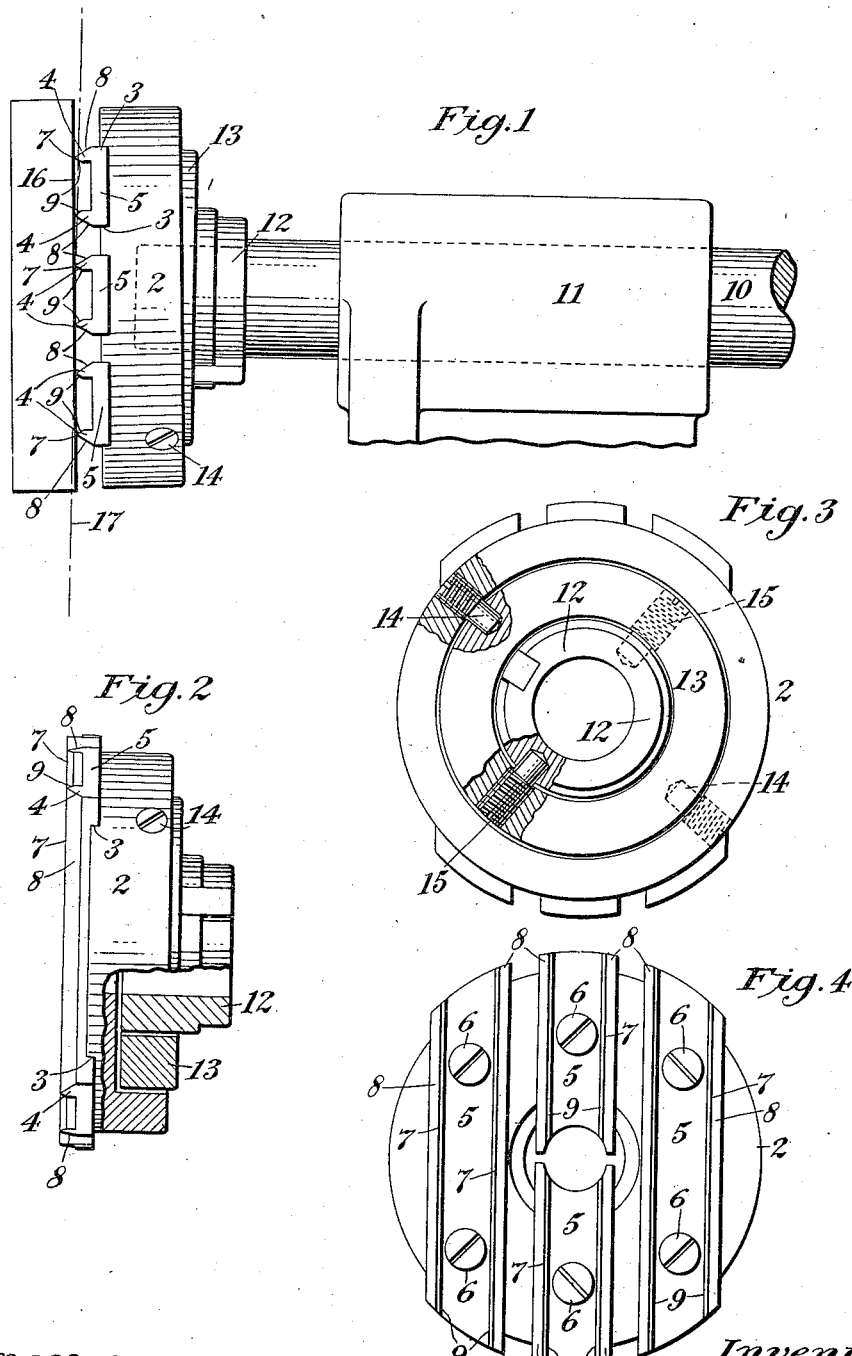

UNITED STATES PATENT OFFICE.

FRANK L. SMITH, OF CHICAGO, ILLINOIS, AND THOMAS B. WILLIAMS, OF ORANGE, MASSACHUSETTS, ASSIGNORS TO THE LEAVITT MACHINE COMPANY, A CORPORATION OF MASSACHUSETTS.

ROTARY SCRAPER.

1,012,926.   Specification of Letters Patent.   Patented Dec. 26, 1911.

Application filed December 9, 1908. Serial No. 466,657.

*To all whom it may concern:*

Be it known that we, FRANK L. SMITH and THOMAS B. WILLIAMS, citizens of the United States, and residents, respectively, of Chicago, county of Cook, State of Illinois, and Orange, in the county of Franklin and State of Massachusetts, have invented certain new and useful Improvements in Rotary Scrapers, of which the following is a specification.

This invention relates to improvements in rotary scrapers, and the main object of the invention is to provide a rotary scraping tool capable of facing or dressing the surface of a piece of work and so constructed that the scraping or cutting edges of the tool can not dig into the work and thereby mar the appearance of the same or increase the length of time taken to finish the work on such face.

We have found in practice that in working on various kinds of material it is difficult to form a smooth surface by means of ordinary cutting tools, owing to the tendency of the cutting edge to dig into the work and remove a larger piece or chip than is necessary or desirable, and that this tendency can be avoided by making use of a considerable number of cutting edges substantially covering an area of considerable length and breadth, each cutting or scraping edge in such a construction serving as a guide and stop for the others, and all of such edges operating when so combined to scrape or cut the work to the same depth at each operation. We have also found that this tendency of the scraping or cutting edge of the tool to dig into the work is materially reduced by constructing the tool in such a manner that the intersecting faces forming the cutting edge, and particularly the leading face, will make an acute angle with a line perpendicular to the plane of the cutting edges, this acute angle being in advance of such perpendicular in the case of the leading face of the tool and in the rear of the perpendicular for the other face of the tool. We have also found that a rotary scraping tool of this type need not be rigidly connected with its operating driver or spindle, but may have a pivotal connection therewith, preferably a universal connection, which will permit it to take a position in which the scraping edges of the tool lie in a plane oblique to the axis of the driving spindle, in which position the edges of the tool will operate properly on the work owing to the fact that no one of the edges can cut or scrape in advance of any other. This and other features of our invention are illustrated in the accompanying drawings, in which—

Figure 1 is a side elevation of a rotary scraper in operative relation with a piece of work; Fig. 2 is a sectional side elevation of the scraper detached from its operating spindle; Fig. 3 is a rear elevation of the same, with parts broken away to show the universal connection, and Fig. 4 is a front elevation or face view of the scraper, showing the scraping or cutting blades.

Similar characters designate like parts in all the figures of the drawing.

Our improved rotary scraper will embody as its main elements a rotatable head and suitable scraping or cutting blades carried thereby. The cutting head may be an annular one of the type designated generally by 2, and has in the face thereof channels or ways in which the scraping blades will preferably be mounted. Each of these channels preferably has a vertical wall, such as 3, at its opposite edges, the walls shown being parallel with each other. In these channels the cutters are seated in such a way that at least one edge of the channel forms a stop-wall for supporting the scraping blade and the edge thereof.

The scraping edges may be of any construction suitable for the purpose, as may be the blades in which they are embodied, but we find it advantageous to make the scrapers as shown in the drawings, in which two blades, such as 4, are formed from a single bar of steel by channeling the bar and properly facing off the projections at opposite sides of the channel. These duplex scraping blades and the bars 5 from which they are formed are held in place in any suitable manner in the channels in the face of the tool-head 2, as by means of screws 6. It will be noticed that the bars 5 just fill these channels and that their opposite edges are in contact with the stop-walls 3 at all points in the length of each bar, so that each scraping edge 7 is firmly braced throughout the whole length thereof.

It will be noticed that the edge 7 of each scraping blade is shown as formed by two faces 8 and 9, each of which makes an acute angle with a line perpendicular to the plane in which the cutting edges lie and that these angles are at opposite sides of the perpendicular passing through the cutting edge. Because of this construction the edge 7 in each case operates with a true scraping action and has no tendency to dig into the work and take a cut or chip of excessive depth or thickness. It is especially important that the leading face of each scraping blade be thus constructed. As the tool may be operated by rotation in either direction it is desirable to form both faces in such a manner as to make substantially similar angles at opposite sides of the perpendicular through the scraping edge of the blade.

Ordinarily a considerable number of scrapers or cutters 4 will be used, the object of this being to cover an area of considerable length and breadth and thus assure as broad a base or support as possible for each point in each scraping edge. The extent of the surface covered by these edges will be clear by referring to Fig. 4. Practically the whole face of the tool-head 2 is covered by these blades, the area so covered having its center substantially in the axis of the tool. A very uniform scraping action results from a tool constructed as shown and described, as all points in the edges of the blades are located in a common plane and have a broad cutting base supporting them, so that it is impossible for any scraping edge or any point therein to obtain a lead over any other scraping edge or any point in such other edge.

The construction just described is such as to permit the mounting of the rotary scraper on a driver in such a manner as to have a pivotal or universal movement relative thereto. A rotary carrier or driver suitable for operating the scraper is shown at 10. This may be any suitable driving spindle mounted and operated in any proper manner, the spindle being illustrated as journaled in a bearing 11 forming part of a suitable machine frame. This spindle is illustrated as reduced at its point of connection with the scraper to form a shoulder adapted to press against one member 12 of the tool-head. This tool-head comprises in the present instance three main parts, two of which are the ring or hub 12 and the head proper 2, while the third is illustrated as an intermediate ring or annulus 13 pivotally connected with the parts 12 and 2. The pivots employed for connecting these three rings are shown at 14 and 15, the pivot-pins 15 being placed at right angles to the pins 14 and serving to pivotally support the ring 12 in the ring 13, while the pins 14 serve to pivot the head proper 2 on the ring 13 about an axis at a right angle to the axis of the ring 13 pivoted on the ring 12. By means of this universal connection the outer ring or head proper 2 and the scrapers carried thereby are permitted to take any desired angular position, within limits, relative to the axis of the driver 10. Thus when the scraper is rotated in contact with the face 16 of a piece of work inclined so as to lie at an oblique angle to the axis of the driver 10, the scraping edges 7 will all adjust themselves to this obliqueness of the surface to be scraped and will scrape or cut a true annular surface thereon while rotating in a plane slightly oblique to the axis of said driver.

It will be noticed that the rotary scraper just described is capable of scraping or cutting to a point close to the axis of rotation, the tool being particularly intended for scraping annular pieces that require to be brought to a true surface. The driver 10 obviously may if desired extend through the scraper and indeed through the work when the latter is in ring form, and this whether the work is perpendicular to the axis of the driver 10, which position is indicated by the dotted line 17, or whether it is inclined obliquely thereto, as shown at 16.

What we claim is:

A rotary scraper, comprising a rotary carrier, and a head and universal connections between said carrier and head, said head embodying a plurality of individual scraping blades having their scraping edges in a common plane transverse to the axis of rotation of the head, each of said blades being substantially V-shaped in cross-section and having its opposite faces at opposite sides of a line intersecting its scraping edge which line is parallel with the axis of said head, the number and positions of said scraping edges being such that they serve to prevent tipping of the scraping head when in contact with the work.

Signed at Chicago in the county of Cook and State of Illinois this first day of December, A. D. 1908.

FRANK L. SMITH.

Witnesses:
   CHAS. S. BURTON,
   JULIA S. ABBOTT.

Signed at Orange, in the county of Franklin and State of Massachusetts, this 19th day of November, A. D. 1908.

THOMAS B. WILLIAMS.

Witnesses:
   FRED A. DEXTER,
   FRANK A. HOWE.

---

Copies of this patent may be obtained for five cents each, by addressing the "Commissioner of Patents, Washington, D. C."